US007947615B2

(12) United States Patent
Springer et al.

(10) Patent No.: US 7,947,615 B2
(45) Date of Patent: May 24, 2011

(54) ACOUSTICAL CANOPY SYSTEM

(75) Inventors: Brian L. Springer, Lancaster, PA (US);
John Felegi, Jr., Lancaster, PA (US);
James R. Waters, Lancaster, PA (US);
Guillaume Martin, Villecresnes (FR)

(73) Assignee: AWI Licensing Company, Wilmington, DE (US)

( * ) Notice: Subject to any disclaimer, the term of this patent is extended or adjusted under 35 U.S.C. 154(b) by 43 days.

(21) Appl. No.: 11/397,666

(22) Filed: Apr. 4, 2006

(65) Prior Publication Data

US 2007/0017179 A1 Jan. 25, 2007

Related U.S. Application Data

(60) Provisional application No. 60/667,931, filed on Apr. 4, 2005.

(51) Int. Cl.
*E04C 2/30* (2006.01)
*E04C 2/10* (2006.01)
*B32B 5/26* (2006.01)

(52) U.S. Cl. ........ 442/381; 428/198; 442/180; 52/783.1

(58) Field of Classification Search ........... 442/381–393
See application file for complete search history.

(56) References Cited

U.S. PATENT DOCUMENTS

| 1,871,571 | A | * | 8/1932 | Weber | 52/3 |
| 3,583,522 | A | | 6/1971 | Rohweder et al. | 181/33 |
| 3,959,572 | A | | 5/1976 | McCartan et al. | 428/172 |
| 5,839,237 | A | * | 11/1998 | Davidson | 52/3 |
| 6,547,868 | B1 | * | 4/2003 | Belmares et al. | 106/217.3 |
| 7,207,151 | B2 | * | 4/2007 | Swiszcz et al. | 52/793.11 |
| 2005/0011133 | A1 | * | 1/2005 | Meyer | 52/3 |

FOREIGN PATENT DOCUMENTS

| AU | 199176035 A1 | * | 11/1991 |
| DE | 22 44 295 A1 | | 3/1974 |
| EP | 0 381 452 A2 | | 8/1990 |
| EP | 0 521 657 A1 | | 1/1993 |
| GB | 2 063 960 A | | 6/1981 |
| GB | 2 200 591 A | | 8/1988 |
| WO | WO 90/01090 | | 2/1990 |
| WO | WO 90/12934 | | 11/1990 |
| WO | 01/90512 A1 | | 11/2001 |

* cited by examiner

Primary Examiner — Jennifer A Chriss

(57) ABSTRACT

An interior building system which includes a curved, acoustical, self-supporting composite panel which differentiates and accents the interior building space, and, at the same time, provides substantial sound absorbing capabilities. The composite panel is composed of two or more layers of non self-supporting soft fiber material and a discontinuous layer of adhesive interposed between each of the soft fiber layers. The system further includes mounting hardware for attaching the panel to the building structure. The mounting hardware has a perforated plate which is embedded in the panel which minimizes the visibility of the hardware, and, at the same time, provides enhanced load bearing capabilities.

11 Claims, 3 Drawing Sheets

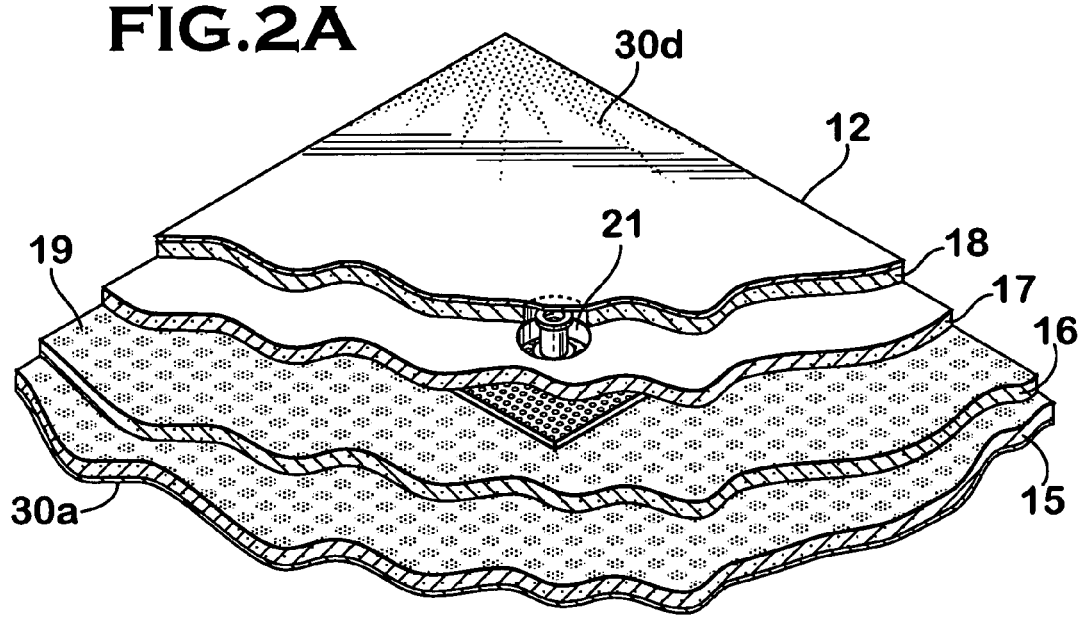
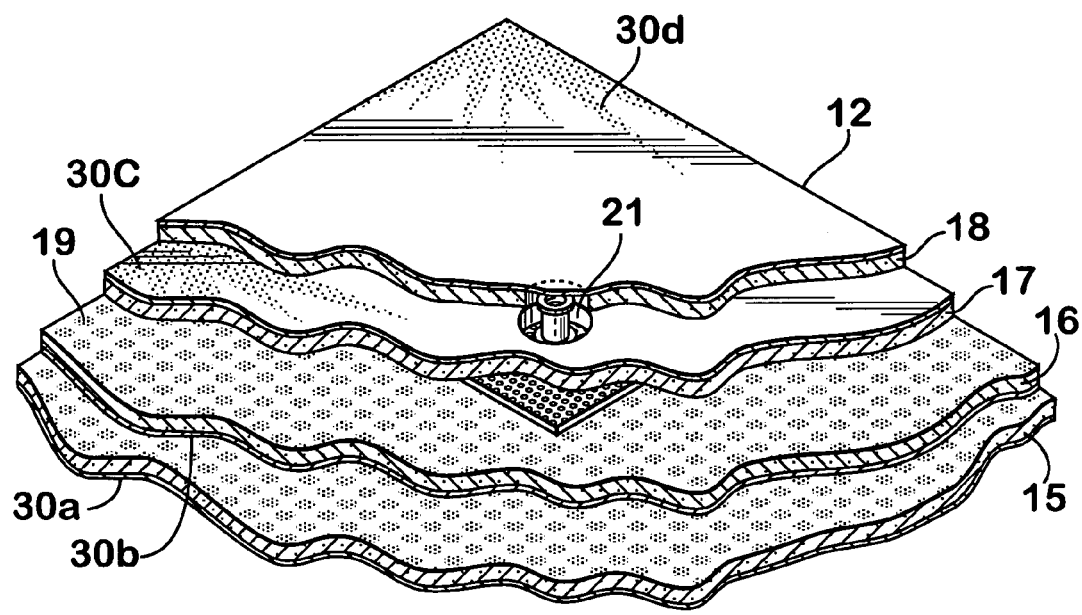

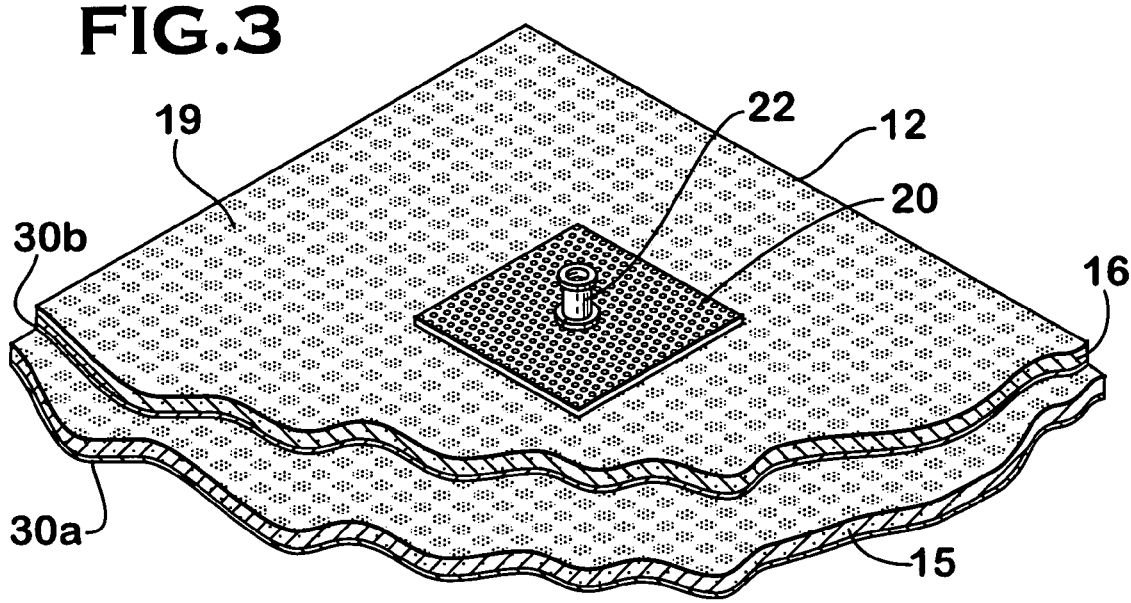
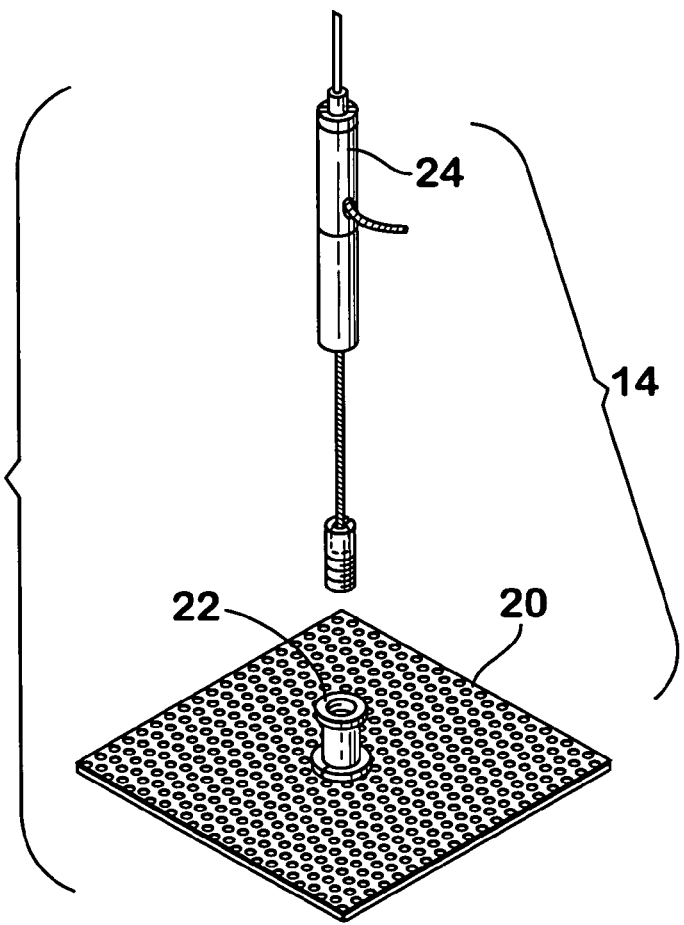

ACOUSTICAL CANOPY SYSTEM

CROSS REFERENCE TO RELATED APPLICATION

This application claims the benefit under 35 U.S.C. §119(e) of U.S. provisional application Ser. No. 60/667,931, filed Apr. 4, 2005.

BACKGROUND

The present invention relates generally to interior building systems, and, in particular, to a system having a composite soft fiber baseboard that can support itself with minimal sag.

Conventional suspended ceiling systems found in offices, retail stores and similar commercial settings typically include suspended grids which support acoustically absorbent soft fiber tiles. These systems typically span the length of the room, i.e. are continuous, and create a uniform appearance. While such continuous suspended systems provide a pleasant and acoustically absorbent space, designers, architects and building owners often object to the use of these systems for several reasons, including lowered ceiling height and cost of materials to accommodate the entire span. As a result, more and more interior building spaces have open-plenum, or open-loft, ceiling designs in which at least a substantial portion of the hard ceiling, HVAC duct work, wiring and the like are exposed. The open-plenum design, however, tends to leave the space unstructured and, consequently, less useful and less aesthetically pleasing.

Several attempts have been made in the open-plenum interior building environment to differentiate the space and provide aesthetic appeal. One emerging market is the accent canopy market. Examples of existing accent canopy systems include INFUSIONS Accent Canopies by Armstrong World Industries, Inc. The INFUSIONS Accent Canopies include a flexible panel structure and hanging members which support the flexible panel structure. In addition, biasing member cooperate with the flexible panel to maintain the panel in a flexed, generally curved, configuration. Unfortunately, the INFUSIONS panels are formed of polymeric materials which have no sound absorbing capabilities.

What is needed is a product for use in an open-plenum design, which differentiates and accents the space, and, at the same time, includes sound absorbing capabilities of conventional mineral fiber tiles.

SUMMARY

The interior building system of the invention includes a curved, acoustical, self-supporting composite panel and mounting hardware for attaching the panel to the building structure. The composite panel is composed of at least two layers of non self-supporting soft fiber material and a discontinuous layer of adhesive interposed between each of the soft fiber layers. The panel also has a portion of the hanging hardware embedded therein. The system differentiates and accents the interior building space, and, at the same time, provides substantial sound absorbing capabilities and aesthetic appeal.

BRIEF DESCRIPTION OF THE DRAWINGS

FIG. 2A is an exploded perspective view of a corner section of the soft fiber composite panel of the invention having portions cut away to illustrate an example embodiment of the interior of the panel.

FIG. 2B is an exploded perspective view of a corner section of the soft fiber composite panel of the invention having portions cut away to illustrate an alternative example embodiment of the interior of the panel.

FIG. 3 is a perspective view of portion of FIG. 2A illustrating the perforated plate of the invention.

FIG. 4 is an exploded perspective view of an example embodiment of the hardware system for mounting the soft fiber composite panel of the invention.

DETAILED DESCRIPTION OF THE INVENTION

Figure 1:
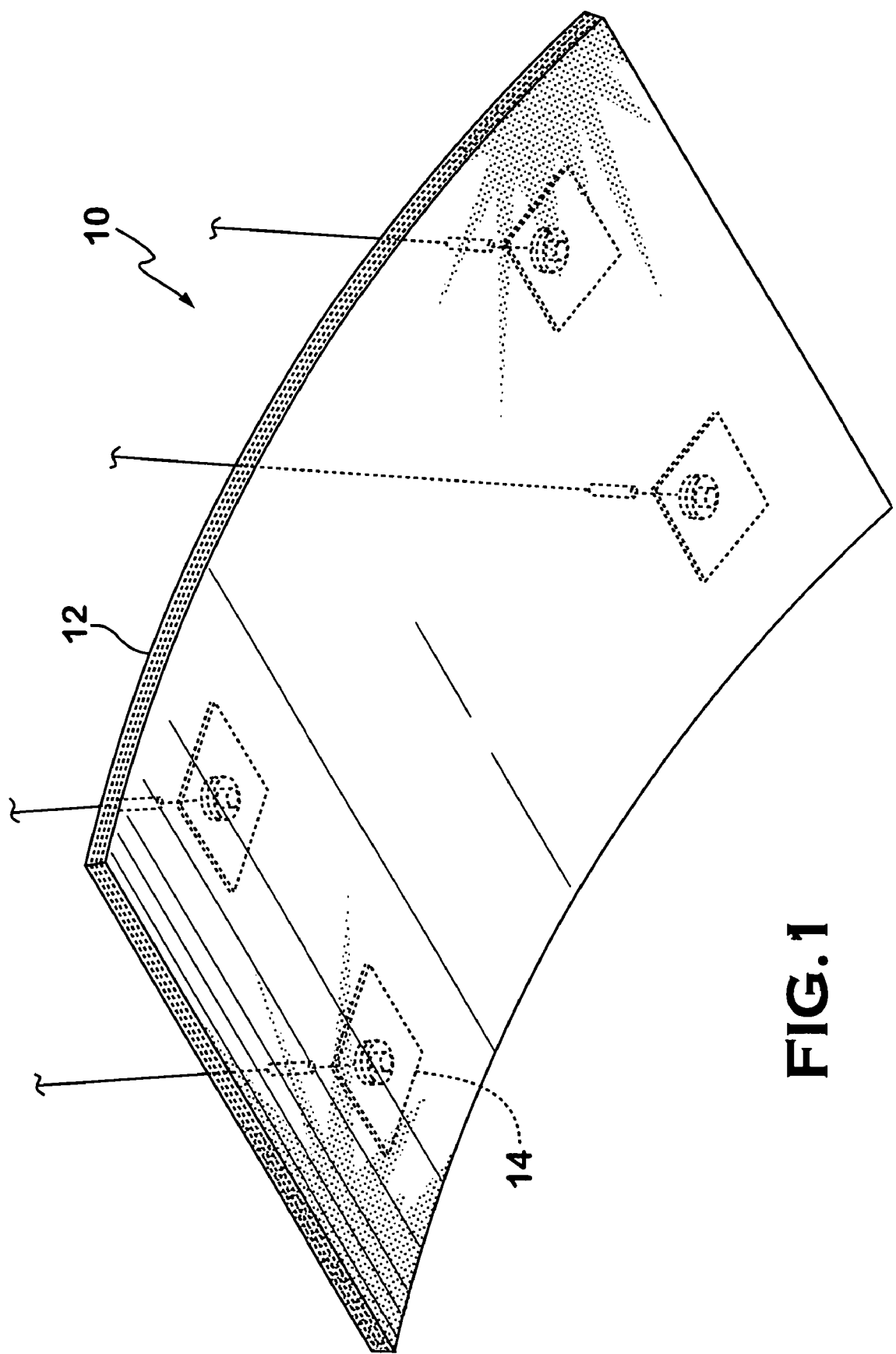
FIG. 1 is a perspective view of an example embodiment of an interior building system having the soft fiber composite panel of the invention.

FIG. 1 illustrates an example embodiment of the interior building system of the invention. The system 10 includes a curved, acoustic composite panel 12 and mounting hardware 14 for attaching the panel 12 to the interior building structure. Although the panel 12 of the invention can have several curved profiles, including a hill-type arc, a valley-type arc, etc., for purposes of illustration, the configuration shown though out the drawings is of a hill-type arc.

The aforementioned panel 12 is composed of two or more layers of soft fiber material. Each soft fiber layer is composed of acoustical mineral fibers or medium density fiberglass. One example of acceptable soft fiber material is wet-formed mineral fiber board sold by Armstrong World Industries, Inc. under the name ULTIMA. Referring to FIGS. 2A and 2B, in the preferred example embodiment, the panel has four layers: first and second interior layers, 16 and 17, and first and second exterior layers, 15 and 18. The thickness of each soft fiber layer is in the range from about 0.125 to about 0.40 inches, and preferably between about 0.225 to about 0.310 inches. The soft fiber layers are more flexible at the low end of this range, and, thus, the panel will be capable of being molded into a panel having a smaller radius than panels having a thickness at the upper end of the thickness range. More specifically, the achievable radius is approximately 4 feet when using soft fiber layers having a thickness of about 0.125 inches and approximately 15 feet when using soft fiber layers having a thickness of about 0.40 inches. For ease of illustration, the soft fiber layers 15-18 each have the same thickness; however, each layer can have a different thickness.

The panel 12 also includes a discontinuous layer of adhesive 19 in between each soft fiber layer. The discontinuous layer of adhesive can have various patterns, e.g. dots, stripes, etc. Maintaining discontinuity in the adhesive layer is necessary to minimize the negative impact of the adhesive layer has on the sound absorbing capabilities of the panel. It should be noted that the adhesive can be applied to each panel surface described herein in an amount from about 10 to about 30 grams per square foot, and preferably in the range from about 16 to about 25 grams per square foot.

In one example embodiment, each adhesive layer comprises 25 grams per square foot. In one example embodiment, droplets of a glue-type adhesive are screened onto the horizontal surface on the soft fiber layer using, for example, a perforated screen having a 20% open area consisting of 3/16" diameter holes having 0.109" center to center spacing of 0.0625" diameter staggered round holes. Acceptable types of adhesive materials include polyvinyl acetate and vinyl acrylic. While preserving the acoustical capabilities of the soft fiber layers, the discontinuous adhesive layer 19 provides improved structural strength to the panel as the droplets are of sufficient height to penetrate the surface of the contacting layers and, in turn, create a weld-like attachment of one soft fiber layer to another.

In contrast, from the description of WO 90/01090, a method is known for the manufacture of curved mineral wool panels. According to this method, a flat mineral fiber ceiling panel is split into at least two layers and is rebuilt to form the profiled ceiling panel. The at least two layers are rejoined by means of a continuous layer of adhesive. The continuous layer of adhesive is said to provide a reinforcing effect, however, the adhesive is continuous, and thus, will have a substantial impact on the ability of the panel to absorb sound.

Though not critical to the acoustic performance of the board, each of the outermost fiberboard layers, e.g. layers 15 and 18, may optionally include a scrim 30 adhered to the exposed surface. Acceptable scrims include Owens Corning's A80EF or YK111 fiberglass scrims. The scrim 30 imparts rigidity to the panel and improves handling of the board. This scrim 30 can be painted with an acoustically porous paint, such as Armstrong's DURABRITE acoustically transparent paint, to finish the panel. Panels 12 having scrims adhered to the outer layers 15, 18 have a maximum flexure stress of 131 psi.

The fiberglass scrims 30 are an option for use on the interior layers 16 and 17 as shown in FIG. 2B. The advantage of a scrim 30 being adhered to one or both of the interior layers 16, 17 is to reinforce the soft fiber layer for ease of handling. Panels 12 having scrims adhered to all layers soft fiber have a maximum flexure stress of 182 psi.

As shown throughout the drawings, the composite soft fiber panel 12 can be suspended from an overhead ceiling or wall location using suspension hardware 14. The suspension hardware 14 of the invention is an improvement over existing suspension systems in that a substantial portion of the hardware is embedded in the panel, which in addition to being less visible, provides enhanced load bearing capabilities. As best shown in FIG. 5, the preferred suspension hardware 14 includes a substantially flat, perforated plate 20. As the perforated plate 20 contributes to the load bearing capabilities of the hardware 14, the choice of the type of material and size of the perforated plate 20 is dependent on the total weight of the baseboard to be supported.

In the example embodiment shown in FIGS. 3 and 4, the plate 20 is positioned between the interior soft-fiber layers 16 and 17. It should be noted that the plate 20 can be positioned between any two layers depending on the weight of the finished panel 12. Since the plate 20 is perforated, the wet adhesive will pass into the perforations.

The stack of soft fiber and adhesive layers, along with the embedded perforated plate, are transferred to a mold which is closed with clamps. In the mold, the adhesive will dry. The dried layers of adhesive impart rigidity which enables the panel to pass long term sag tests. Since some adhesive will dry in the perforations of plate 20, the load bearing capabilities of the panel are enhanced. For example, the plate 20 will be able to better distribute forces, which in turn, will result in the ability of the panel to withstand seismic level forces without hardware pullout. Once the panel 12 is removed from the mold, the vertical edges of the panel can be finished with the same acoustical scrim material and paint as applied to the horizontal surfaces of the exterior layers 15 and 18.

Extending from the top surface of the perforated plate is a male receiver 22, such as a non-plated brass barrel for attaching hanging cables 24 to the baseboard 12. When the system is installed, the only visible part of the hardware 14 is a portion of the receiver 22 and the cable 24 extending therefrom.

Formation of an example panel 12 is now described in greater detail with reference to FIG. 2A. Four standard high wool formula panels 15-18, such as the wet-formed mineral fiber panels sold by Armstrong World Industries, Inc. under the name ULTIMA, are back sanded to a thickness of 0.310 inches. Each panel 15-18 when individually tested for NRC as per ASTM C423a, has an NRC of 0.70.

A first soft fiber panel 15, having scrim 30A on one horizontal surface, is set onto a flat surface with the scrim 30A side down. The horizontal surface of panel 18 opposite the scrim 30A has a discontinuous adhesive layer 19 applied thereto. A second soft fiber panel 16 with scrim 30B on one horizontal surface and a discontinuous adhesive layer 19 on the opposite the surface having the scrim 30B is then placed scrim side down onto the first panel 15. At least one perforated plate 20 with receiver 22 extending vertically therefrom is then positioned plate side down onto second panel 16. In the example embodiment shown in FIG. 1, a perforated plate is positioned on each of the four corners of second panel 16. The plate 20 is perforated 20 GA 8"×8" type 304 stainless steel. A third soft fiber panel 17 with scrim 30C on one horizontal surface is placed scrim side up onto the second panel 16. Thus, the perforated plates 20 are sandwiched between layers 16 and 17. The third soft fiber layer 17 includes apertures 21 extending therethrough to accommodate receiver 22. A fourth soft fiber layer 18 having scrim 30D on one horizontal surface and a layer of adhesive (not shown) on the opposite horizontal surface is set onto the third panel 17 with the scrim side up. It should be noted that each adhesive layer can either be applied to the panels prior to or during the stacking process. For example, it may be easier to silk-screen the adhesive onto the layers prior to stacking.

The stack of four boards is transferred onto the bottom form of a mold having the desired radius with the scrim 30A side down. A top form having the same desired radius is set onto the top of the stack. The forms are clamped together and allowed to set overnight to allow the adhesive to dry. After the adhesive is dry, the panel is removed from the form, and, if desired, the panel can be cut to the desired size. The vertical edges of the panel are banded with a prefinished scrim to match the face and back finished surfaces. The shape of the panel is not limited to a particular radius, thus, it is possible to create tighter radii or a flat panel.

The acoustical canopy of the invention provides greater sound absorption than continuous ceilings with the same visible surface area because they absorb sound from all sides. The total sound absorption for the acoustical panels of the invention is appropriately reported in Sabins, according to ASTM C 423. This ASTM test methodology differentiates between "unit absorbers" such as the acoustical canopies of the invention and continuous ceilings which are typically reported as NRC. While NRC represents the percent absorption of a material per sq ft., the Sabin is a good measure of the total sound absorption of a panel, i.e. the front, back and sides of the panel.

The Sabin value for the four layer configuration described above is in the range from about 25 to about 45 Sabins per 25 square foot of total panel size. The Sabin value was calculated as an average absorption over the four key speech frequencies of: 500, 1000, 2000, and 4000 Hz. It should be noted that the Sabin value does not change whether it is installed in the hill configuration as shown in FIG. 1 or valley configuration (not shown).

The above description of the invention is provided as an enabling teaching of the invention in its best, currently known embodiment. Those skilled in the relevant art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the above description is provided as illustrative of the principles of the present invention and not in limitation thereof, since the scope of the present invention is defined by the claims.

We claim:

1. An interior building system comprising:
a composite panel having least two layers of non-self supporting soft fiber material and a discontinuous layer of adhesive interposed between each of the at least two non-self supporting soft fiber layers, the at least two non-self supporting layers in combination being self-supporting; the composite panel having an exterior surface comprising first and second opposed major surfaces and a circumferential edge surface extending therebetween, each of the opposed major surfaces and circumferential edge surface being painted with an acoustically porous paint, wherein each of the opposed major surfaces and circumferential edge surface absorb sound.

2. The interior building system of claim 1, wherein the composite panel is curved.

3. The interior building system of claim 2, wherein each of the at least two non-self supporting soft fiber layers has a thickness in the range from about 0.125 to about 0.40 inches.

4. The interior building system of claim 3, wherein the radius of the panel is in the range from about 4 to about 15 feet.

5. The interior building system of claim 4, wherein each of the at least two non-self supporting soft fiber layers has fibers disposed in random orientation.

6. The interior building system of claim 1, wherein attachment hardware is embedded in the panel.

7. The interior building system of claim 6, wherein the embedded attachment hardware is a perforated plate.

8. The interior building system of claim 7, wherein the perforated plate is positioned between two of the at least two non-self supporting soft fiber layers.

9. The interior building system of claim 1, wherein each of the at least two non-self supporting soft fiber layers are selected from the group consisting of mineral fibers, fiberglass and combinations thereof.

10. The interior building system of claim 1, wherein the adhesive layer is present in an amount from about 10 to about 30 grams per square foot.

11. The interior building system of claim 8, wherein a portion of the discontinuous layer of adhesive penetrates the perforations of the plate.

* * * * *